Oct. 4, 1932.  W. NOBLE  1,880,270
INTERNAL COMBUSTION ENGINE
Filed Aug. 7, 1930
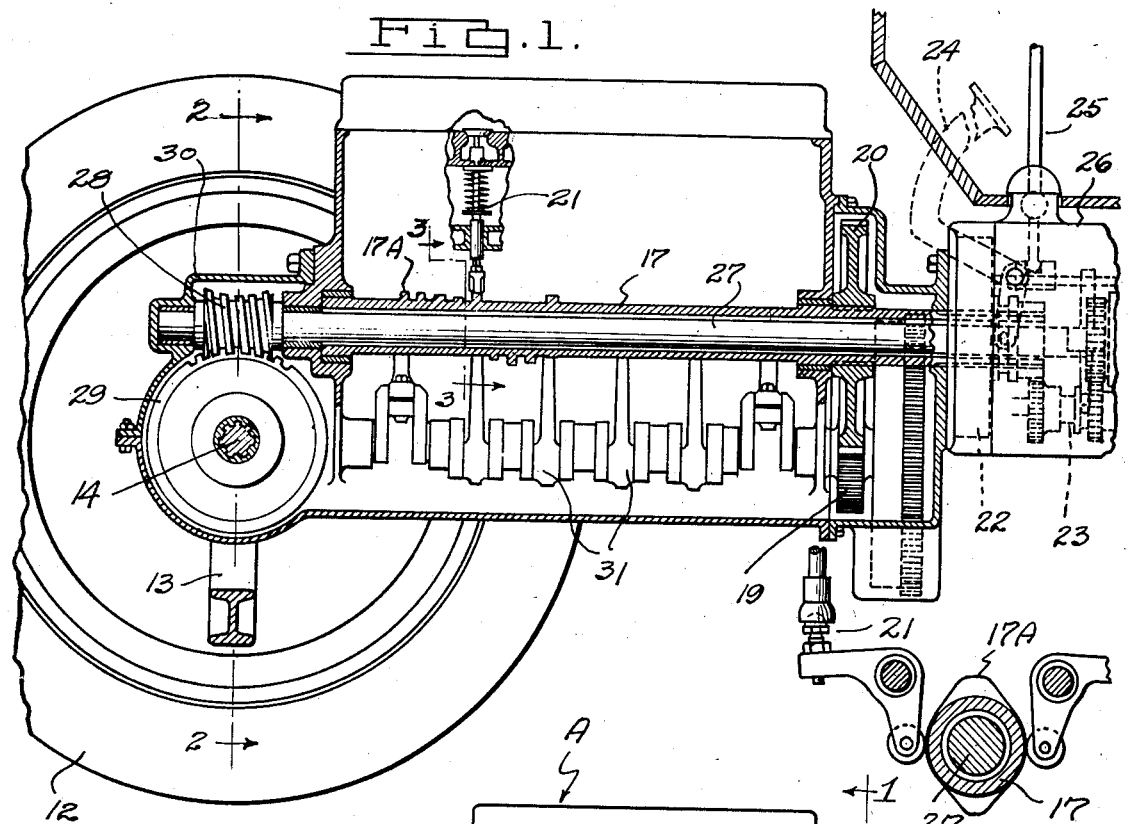
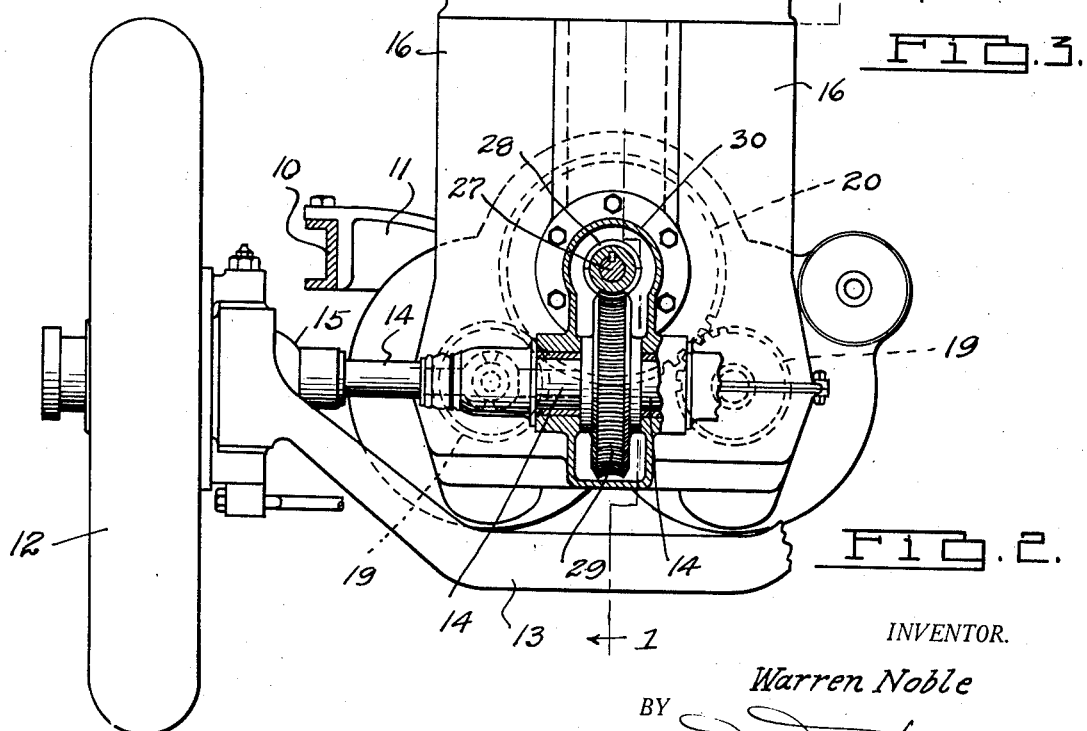
INVENTOR.
Warren Noble
BY W. W. Harris
ATTORNEY.

Patented Oct. 4, 1932

1,880,270

UNITED STATES PATENT OFFICE

WARREN NOBLE, OF DETROIT, MICHIGAN

INTERNAL COMBUSTION ENGINE

Application filed August 7, 1930. Serial No. 473,541.

My invention relates to internal combustion engines of the type adapted for association with self-propelled vehicles of the front wheel drive type, and more particularly my invention relates to the means for transmitting the power from the engine to the front wheels of such a vehicle.

One of the objections to the present day type of front wheel drive vehicles is the excessive length of hood employed to cover the engine and the driving mechanism that is associated therewith and located to the front of the engine which requires an expensive and complicated system of remote control for operating the clutch and transmission. There is sufficient space in rear wheel drive vehicles at the rear of the engine underneath the foot boards to house the clutch and transmission conveniently located with respect to the clutch pedal and gear shift lever. With front wheel drive vehicles this space to the rear of the engine underneath the footboards is not utilized.

One of the objects of my invention is to provide an improved assembly of an engine and driving mechanism, thereby facilitating the assembly thereof with a front wheel drive vehicle with a minimum of labor and expense and eliminating the complicated and expensive remote control devices.

Another object of my invention is to provide an improved arrangement of the engine and the driving mechanism associated therewith that utilizes the available space to the best advantage for maintaining the overall length and height of the vehicle at a minimum.

A still further object of my invention is to provide an engine and drive assembly adapted for a front wheel drive vehicle that may be housed in a hood of standard construction, by providing a drive shaft constructed and arranged to extend longitudinally of the engine above the lowermost position of the crank pins of the engine.

It is a further object of my invention to provide the aforesaid simplified arrangement of engine and driving mechanism for the vehicle front wheels while at the same time retaining the advantages of a low center of gravity for the engine location and for the vehicle in general. One important advantage derived by my invention resides in a novel location of power shaft for the vehicle front wheels whereby the engine may be located and mounted in an advantageous position.

By reason of my invention the available space in a vehicle chassis is utilized to an improved degree, the advantages of the front wheel drive being retained without the usual disadvantages aforesaid, greater space in a given chassis length being available for the body.

For a more detailed understanding of my invention reference may be had to the accompanying drawing which illustrates one form which my invention may assume, and in which:

Figure 1 is a vertical longitudinal sectional view of my improved internal combustion engine adapted for use with a vehicle of the front wheel drive type and taken substantially on the line 1—1 of Figure 2.

Figure 2 is a front elevational view thereof taken substantially on the line 2—2 of Figure 1, and Figure 3 is a detail sectional view showing the valve cam shaft and associated valve operating mechanism taken on the line 3—3 of Figure 1.

The internal combustion engine and associated driving mechanism illustrated in the accompanying drawing is especially adapted for use with a front wheel drive vehicle. The vehicle comprises the usual chassis frame 10 provided with suitable motor or engine supports 11. The front wheels 12 are supported by a front axle 13 and operatively connected with a driven member or wheel driving shaft 14 having suitable universal joints 15 through which the drive is transmitted.

Any suitable type of engine may be employed within the broad scope of my invention although I prefer and have illustrated an engine A having parallel banks of cylinders 16 and a common valve cam shaft 17 located intermediate the two parallel banks of cylinders. The engine is provided preferably with a crankshaft 18 for each bank of cylinders connected in the usual manner with pistons (not shown) operating in the cylinders. Obviously a single crankshaft for the two banks of cylinders may be employed in other types of engines, such as in the V-type where the cylinder banks are angled from a common crankshaft as will be readily understood.

Suitable driving connections are employed for driving the cam shaft 17 at the customary half crankshaft speed for a four stroke cycle engine, and in the particular type of engine herein illustrated a gear 19 is secured to the rear end of each crankshaft, these gears 19 being engaged with a relatively larger gear 20 which is splined or otherwise fixed to the rear end of the camshaft 17. The camshaft in the illustrated embodiment of my invention is preferably hollow for a purpose which will later appear more apparent. Suitable cams 17A are carried by the valve camshaft 17 for actuating a suitable type of engine valve operating mechanism 21. A motion controlling means is adapted to be operatively connected with the rear end of said camshaft, the said camshaft preferably extending longitudinally through the engine block, while the said motion controlling means is located rearwardly of the engine, and in the illustration said motion controlling means is located to the rear of the engine block in the space ordinarily employed (in rear drive vehicles) to house the same. The motion controlling means comprises a clutch device 22 and a transmission device 23 which may be of standard construction, said devices being re-respectively operated in the usual way by means of the clutch pedal 24 and the gear shift lever 25 said means contained within a housing 26 preferably secured to the rear of the engine block.

A driving intermediary comprising a driving or power shaft 27 is employed for transmitting the power from the transmission device to the wheel driving shaft 14. This power shaft 27 is so arranged, in the illustrated embodiment, with respect to the hollow valve cam shaft that it may be extended longitudinally therethrough, the rear end of the power shaft 27 being operatively connected with the transmission device 23 and the forward end thereof having a worm 28 keyed or otherwise fixed thereto, said worm engaging a worm gear 29 carried by the wheel driving shaft 14. The worm and worm gear or other suitable driving connections are contained within a housing 30 bolted or otherwise secured to the front of the engine block, the wheel driving shaft 14 being thus substantially aligned with the front wheel centers. Where the hollow camshaft is not employed as illustrated, it may follow more conventional locations and construction, the power shaft 27 in any instance of multiple bank engines preferably extending between the longitudinal rows or banks of cylinders. In any event the power shaft 27 is positioned above the lowermost position of the crank pins 31 and the horizontal plane containing the axis of the power shaft lies above the horizontal plane containing the axis of the wheel driving shaft 14. By such an arrangement the objects of my invention are attained.

It may be noted that I have provided a very compact assembly and have employed means for transmitting the motive power that efficiently utilizes all the available space so that the engine and associated driving mechanism can be contained or housed under a hood of practically standard dimensions for rear wheel drive vehicles. Furthermore, within the more specific embodiments of my invention, by employing a hollow camshaft and locating the power shaft 27 of the power transmitting mechanism within the hollow camshaft, I have provided a novel and beneficial compact arrangement of parts.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In a vehicle of the character described the combination of a chassis and engine supported thereby, front vehicle wheels adapted to be driven by said engine, power transmission means positioned rearwardly of said engine, and driving means extending from said power transmission means and operatively connected to drive said front vehicle wheels, said driving means including a power shaft positioned above the axis of rotation of the crank pins of the engine crankshaft.

2. In combination with an internal combustion engine, a hollow camshaft for actuating the engine valves, a drive shaft extending longitudinally within said camshaft, means for driving the camshaft from the engine crankshaft, means for driving said drive shaft at one end thereof from the engine crankshaft, and means for utilizing the power from said drive shaft at the other end thereof.

3. In combination with an internal combustion engine, a hollow camshaft for actuating the engine valves, a drive shaft extending longitudinally within said camshaft, means for driving the camshaft from the engine crankshaft, a change speed transmission, means for driving said drive shaft at one end thereof from the engine crankshaft through said transmission, and means for utilizing the power from said drive shaft at the other end thereof.

4. In combination with an internal combustion engine, a hollow camshaft for actuating the engine valves, a drive shaft extending longitudinally within said camshaft, means for driving the camshaft from the engine crankshaft, means for driving said drive shaft at one end thereof from the engine crankshaft, a vehicle having front driving wheels and carrying said engine, and means for utilizing the power from said drive shaft for driving said front wheels.

5. In a combination with an internal combustion engine, a hollow camshaft for actuating the engine valves, a drive shaft extending longitudinally within said camshaft, means for driving the camshaft from the engine crankshaft, a change speed transmission, means for driving said drive shaft at one end thereof from the engine crankshaft through said transmission, a vehicle having front driving wheels and carrying said engine, and means for utilizing the power from said drive shaft for driving said front wheels.

6. In a vehicle of the character described the combination of a chassis and engine supported thereby, front vehicle wheels adapted to be driven by said engine, power transmission means positioned rearwardly of said engine, and driving means extending from said power transmission means and operatively connected to drive said front vehicle wheels, said driving means including a power shaft positioned above the axis of rotation of the crank pins of the engine crankshaft, and means driving said power transmission means from the engine crankshaft at the rear thereof.

7. In a vehicle of the character described the combination of a chassis and engine supported thereby, front vehicle wheels adapted to be driven by said engine, power transmission means positioned rearwardly of said engine, and driving means extending from said power transmission means and operatively connected to drive said front vehicle wheels, said driving means including a power shaft positioned substantially longitudinally centrally of the engine and above the axis of rotation of the crankpins of the engine crankshaft.

8. In a vehicle of the character described the combination of a chassis and engine supported thereby, front vehicle wheels adapted to be driven by said engine, power transmission means positioned rearwardly of said engine, and driving means extending from said power transmission means and operatively connected to drive said front vehicle wheels, said driving means including a power shaft positioned above the axis of rotation of the crank pins of the engine crankshaft, said engine comprising a pair of cylinder banks and said power shaft extending between said banks.

9. In a vehicle of the character described the combination of a chassis and engine supported thereby, front vehicle wheels adapted to be driven by said engine, power transmission means positioned rearwardly of said engine, and driving means extending from said power transmission means and operatively connected to drive said front vehicle wheels, said driving means including a power shaft positioned above the axis of rotation of the crank pins of the engine crankshaft, said power transmission means including a clutch and a change speed transmission.

10. In a vehicle of the character described the combination of a chassis and engine supported thereby, front vehicle wheels adapted to be driven by said engine, power transmission means positioned rearwardly of said engine, and driving means extending from said power transmission means and operatively connected to drive said front vehicle wheels, said driving means including a power shaft positioned above the axis of rotation of the crank pins of the engine crankshaft and also including a wheel driving shaft geared with the power shaft.

11. In a vehicle of the character described the combination of a chassis and engine supported thereby, front vehicle wheels adapted to be driven by said engine, power transmission means positioned rearwardly of said engine, and driving means extending from said power transmission means and operatively connected to drive said front vehicle wheels, said driving means including a power shaft positioned above the lowermost position of crank pins of the engine crankshaft, said engine comprising a pair of cylinder banks and said power shaft extending between said banks, each of said cylinder banks including a crankshaft, said engine having a camshaft common to both of said cylinder banks, and said crankshafts driving said camshaft.

In testimony whereof I affix my signature.

WARREN NOBLE.